US012245301B2

(12) United States Patent
Chhabra

(10) Patent No.: US 12,245,301 B2
(45) Date of Patent: *Mar. 4, 2025

(54) EXTENDING USE OF A CELLULAR COMMUNICATION CAPABILITIES IN A WIRELESS DEVICE TO ANOTHER DEVICE

(71) Applicant: Apple Inc., Cupertino, CA (US)

(72) Inventor: Kapil Chhabra, Milpitas, CA (US)

(73) Assignee: Apple Inc., Cupertino, CA (US)

( * ) Notice: Subject to any disclaimer, the term of this patent is extended or adjusted under 35 U.S.C. 154(b) by 329 days.

This patent is subject to a terminal disclaimer.

(21) Appl. No.: 17/742,254

(22) Filed: May 11, 2022

(65) Prior Publication Data
US 2022/0272781 A1   Aug. 25, 2022

Related U.S. Application Data

(60) Continuation of application No. 16/922,751, filed on Jul. 7, 2020, now Pat. No. 11,368,992, which is a
(Continued)

(51) Int. Cl.
*H04W 76/14*   (2018.01)
*H04M 3/54*   (2006.01)
(Continued)

(52) U.S. Cl.
CPC ............. *H04W 76/14* (2018.02); *H04M 3/54* (2013.01); *H04M 15/7652* (2013.01);
(Continued)

(58) Field of Classification Search
CPC ............... H04M 3/54; H04M 15/7652; H04M 2250/06; H04M 1/72412; H04W 8/005;
(Continued)

(56) References Cited

U.S. PATENT DOCUMENTS 7,146,191 B2   12/2006   Kerner et al.
7,653,350 B2   1/2010   Camp, Jr.
(Continued)

FOREIGN PATENT DOCUMENTS

CN   2678290 Y   2/2005
CN   1801962 A   7/2006
(Continued)

OTHER PUBLICATIONS

Non-final Office Action, Taiwan Application No. 102140729, mailed Jun. 2, 2015, 6 pages.
(Continued)

*Primary Examiner* — Chi Ho A Lee
(74) *Attorney, Agent, or Firm* — Kowert, Hood, Munyon, Rankin & Goetzel, P.C.

(57) ABSTRACT

Extending cellular telecommunication service from a first UE to another device. The first UE may register for cellular telecommunication service with a cellular network using a first cellular service account, using a cellular communication link via a cellular radio. A second device may be discovered and a communication link may be established between the first UE and the second device. The second device may be registered to use cellular telecommunication capability provided by the first UE. Communications between the second device and the cellular network may be conveyed via the communication link between the first UE and the second device and the cellular communication link. Conveying communications between the second device and the cellular network may provide use of the first cellular service account for cellular telecommunication service to the second device.

20 Claims, 4 Drawing Sheets

Related U.S. Application Data continuation of application No. 16/415,183, filed on May 17, 2019, now Pat. No. 10,736,160, which is a continuation of application No. 15/833,844, filed on Dec. 6, 2017, now Pat. No. 10,299,305, which is a continuation of application No. 15/422,664, filed on Feb. 2, 2017, now Pat. No. 9,844,087, which is a continuation of application No. 14/640,609, filed on Mar. 6, 2015, now Pat. No. 9,615,392, which is a division of application No. 13/671,789, filed on Nov. 8, 2012, now Pat. No. 8,977,269.

(51) Int. Cl.
| | |
|---|---|
| *H04M 15/00* | (2006.01) |
| *H04W 4/16* | (2009.01) |
| *H04W 8/00* | (2009.01) |
| *H04W 88/04* | (2009.01) |
| H04M 1/72412 | (2021.01) |
| H04W 84/12 | (2009.01) |
| H04W 88/08 | (2009.01) |

(52) U.S. Cl.
CPC ............ *H04W 4/16* (2013.01); *H04W 8/005* (2013.01); *H04W 88/04* (2013.01); *H04M 1/72412* (2021.01); *H04M 2250/06* (2013.01); *H04W 84/12* (2013.01); *H04W 88/08* (2013.01)

(58) Field of Classification Search
CPC ....... H04W 4/16; H04W 88/04; H04W 88/08; H04W 84/12; H04W 74/14
See application file for complete search history.

(56) References Cited

U.S. PATENT DOCUMENTS

| | | |
|---|---|---|
| 7,720,021 B1 | 5/2010 | Zhou et al. |
| 8,155,280 B1 | 4/2012 | Or-bach et al. |
| 8,977,269 B2 | 3/2015 | Chhabra |
| 9,615,392 B2 | 4/2017 | Chhabra |
| 9,844,087 B2 | 12/2017 | Chhabra |
| 10,299,305 B2 | 5/2019 | Chhabra |
| 10,736,160 B2 | 8/2020 | Chhabra |
| 2004/0203346 A1 | 10/2004 | Myhre et al. |
| 2006/0057961 A1 | 3/2006 | Dietz |
| 2007/0278438 A1 | 12/2007 | Scott et al. |
| 2010/0166170 A1 | 7/2010 | East et al. |
| 2012/0238208 A1 | 9/2012 | Bienas et al. |
| 2013/0016649 A1 | 1/2013 | Damnjanovic et al. |
| 2013/0079009 A1 | 3/2013 | Aumann et al. |
| 2013/0137469 A1 | 5/2013 | Schmidt et al. |
| 2013/0142118 A1 | 6/2013 | Cherian et al. |
| 2013/0304815 A1 | 11/2013 | Puente et al. |
| 2014/0038582 A1 | 2/2014 | Horneman et al. |
| 2014/0150067 A1 | 5/2014 | Salkintzis et al. |
| 2014/0206346 A1 | 7/2014 | Kiukkonen et al. |
| 2014/0315511 A1 | 10/2014 | Cha et al. |
| 2016/0165481 A1 | 6/2016 | Jin |

FOREIGN PATENT DOCUMENTS

| | | |
|---|---|---|
| CN | 1826793 A | 8/2006 |
| CN | 1984455 A | 6/2007 |
| CN | 201294640 Y | 8/2009 |
| WO | 2008011111 | 1/2008 |
| WO | 201111705 Y | 9/2008 |
| WO | 2008155361 A1 | 12/2008 |
| WO | 2009151452 | 12/2009 |
| WO | 2011081584 | 7/2011 |
| WO | 2012113186 A1 | 8/2012 |

OTHER PUBLICATIONS

Office Action from Taiwanese Application No. 102140729, issued Dec. 30, 2014, English and Chinese versions, pp. 1-19.

Office Action, Chinese Application No. 201380058173.2 OA1, mailed Sep. 29, 2017, 10 pages.

Office Action, Chinese Application for Invention No. 201811018239. 6, mailed Feb. 3, 2020, seven pages.

EXTENDING USE OF A CELLULAR COMMUNICATION CAPABILITIES IN A WIRELESS DEVICE TO ANOTHER DEVICE

PRIORITY INFORMATION

This application is a continuation application which claims priority to U.S. patent application Ser. No. 16/922,751, entitled "Extending Use of a Cellular Communication Capabilities in a Wireless Device to Another Device", filed Jul. 7, 2020, which claims priority to U.S. patent application Ser. No. 16/415,183, entitled "Extending Use of a Cellular Communication Capabilities in a Wireless Device to Another Device", filed May 17, 2019, which claims priority to U.S. patent application Ser. No. 15/833,844, entitled "Extending Use of a Cellular Communication Capabilities in a Wireless Device to Another Device", filed Dec. 6, 2017, now U.S. Pat. No. 10,299,305, which claims priority to U.S. patent application Ser. No. 15/422,664, entitled "Extending Use of a Cellular Communication Capabilities in a Wireless Device to Another Device", filed Feb. 2, 2017, now U.S. Pat. No. 9,844,087, which is a continuation application which claims priority to U.S. patent application Ser. No. 14/640,609, entitled "Extending Use of a Cellular Communication Capabilities in a Wireless Device to Another Device", filed Mar. 6, 2015, now U.S. Pat. No. 9,615,392, which is a divisional application which claims priority to U.S. patent application Ser. No. 13/671,789, entitled "Extending Use of a Cellular Communication Capabilities in a Wireless Device to Another Device", filed Nov. 8, 2012, now U.S. Pat. No. 8,977,269, and which are all hereby incorporated by reference in their entirety as though fully and completely set forth herein.

FIELD

The present disclosure relates to wireless devices, and more particularly to a system and method for a wireless device to extend use of its cellular communication capabilities to additional devices.

DESCRIPTION OF THE RELATED ART

Wireless communication systems are rapidly growing in usage. Further, wireless communication technology has evolved from voice-only communications to also include the transmission of data, such as Internet and multimedia content. As use of wireless communication technology has proliferated, an ever increasing number of devices are being provided with wireless communication capability, such that it is common for a user (or group of users, such as a family) to possess multiple wireless devices.

Additionally, there exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers. Accordingly, it is common for at least some wireless devices to communicate using multiple wireless technologies or standards. For example, some wireless devices (such as some smart phones, etc.), may be capable of cellular communication as well as Wi-Fi communication. Other wireless devices (such as some tablets, portable media players, etc.) may be capable of Wi-Fi communication but not cellular communication.

Thus, it is possible that a user (or group of users) might have a number of wireless devices, among which at least one functions as a cellular telephone, while at least one does not have cellular communication capability. In this case, it is currently not possible for the wireless device without cellular communication capability to utilize the cellular communication capability of the cellular telephone, e.g., to receive and place phone calls. However, at least on some occasions, a user may have a wireless device without cellular communication capability readily available (e.g., if the user is reading on a tablet or watching content on a media player, among various possibilities) but not a cellular telephone (e.g., if the cellular telephone is charging on a docking station, among various possibilities). If the user wants to place or receive a call on such occasions, the user is not able to do so using the readily accessible wireless device without cellular communication capability, but must instead use the less convenient cellular telephone or forego placing or receiving the call altogether. Accordingly, improvements in wireless devices and wireless communications would be desirable.

SUMMARY

In light of the foregoing and other concerns, it would be desirable to provide a way for a wireless user equipment (UE) device with cellular communication capability to extend the use of that cellular communication capability to other devices. Accordingly, embodiments are presented herein of a method for a UE to extend use of its cellular communication capability to additional devices, and a UE configured to implement the method. The UE may include one or more radios (e.g., including at least a cellular radio), including one or more antennas, for performing wireless communications with base stations (BSs), and/or for performing peer-to-peer wireless communications. The UE device may also include a processing element configured to implement part or all of the method (e.g., by executing program instructions). In addition, the UE device may include a non-transitory computer accessible memory medium, which may store program instructions executable by the UE.

For example, if a user is in the vicinity of their cellular device but another wireless device is more readily available, it would be desirable to provide the user with the ability to place and receive calls from the more convenient wireless device, e.g., by extending the cellular communication capability of the cellular device to the more convenient wireless device via a wireless link (e.g., via a Wi-Fi connection through an access point, or via a peer-to-peer Wi-Fi link).

Alternatively, the user might not be in the immediate vicinity of their cellular device, but may have available a device which is capable of communicating with the cellular device via a wide area network (WAN), such as the Internet. It would similarly be desirable to provide the user with the ability to place and receive calls from the more convenient device e.g., by extending the cellular communication capability of the cellular device to the more convenient device via the WAN. Such communication could be performed via a server (e.g., a cloud service providing the connection between the associated devices) and/or via a direct IP link.

Providing the capability to extend cellular telecommunication service obtained by a UE to additional devices via a local wireless connection or a WAN may further open up additional possibilities which may be desirable to users. For example, it is possible that incoming calls could be selectively forwarded by the UE to certain devices registered to use the UE's cellular telecommunication capabilities. This might be desirable, for example, if the cellular account were being shared by multiple users, such as a family. Thus, based on address book contact information (or another basis), incoming calls from certain contacts might be forwarded to devices associated with those contacts but not to devices which are not associated with those contacts. As another possibility, it might be preferable to forward incoming calls only to registered devices which are being actively used, e.g., in order to avoid draining battery power of devices which are not actively being used (e.g., since it may be that no user is nearby such a device). Alternatively, incoming calls could be forwarded to all registered devices, enabling any such devices to answer those incoming calls.

BRIEF DESCRIPTION OF THE DRAWINGS

A better understanding of the present subject matter can be obtained when the following detailed description of the preferred embodiment is considered in conjunction with the following drawings, in which.

Figure 1:
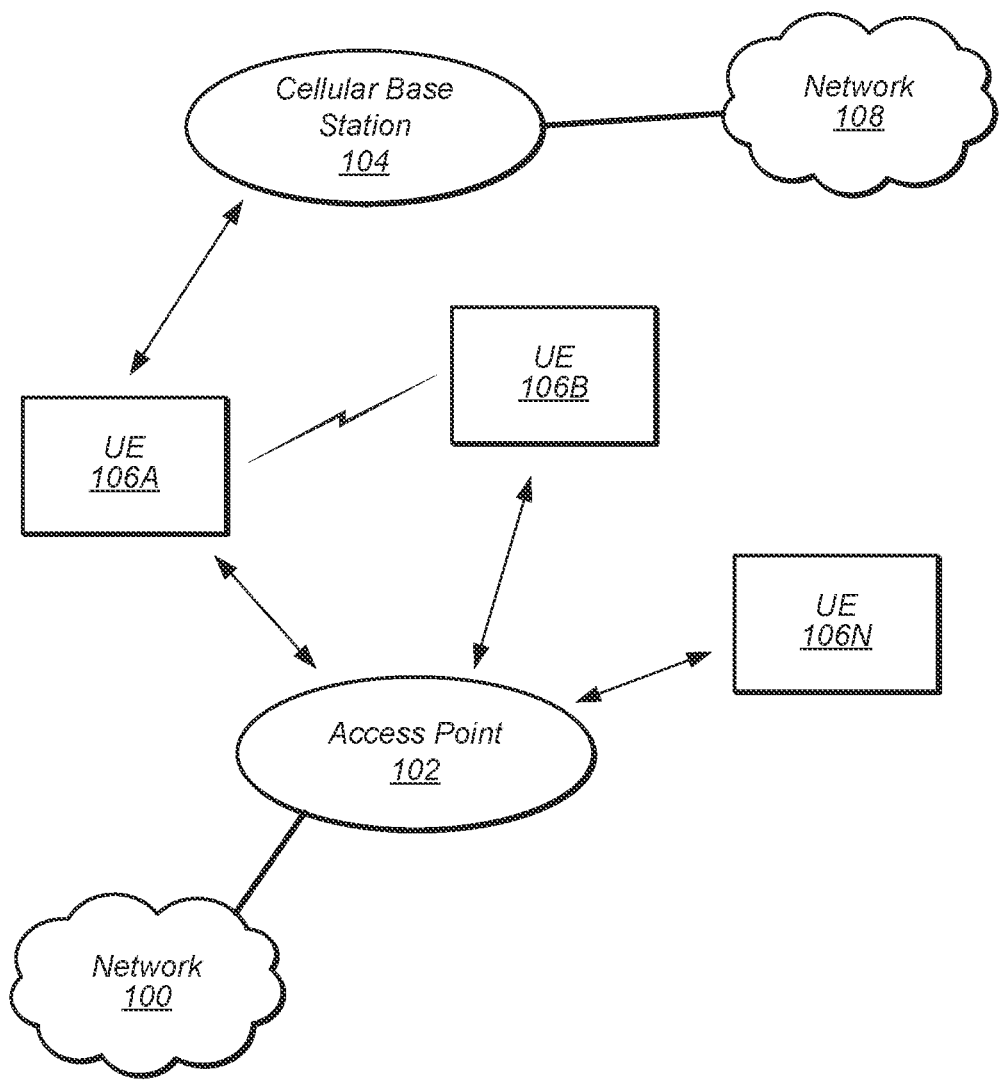
FIG. 1 illustrates an exemplary (and simplified) wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
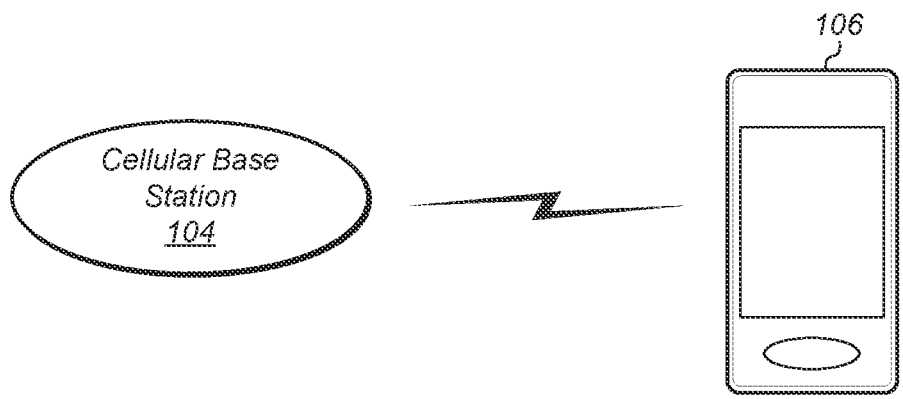
FIG. 2 illustrates a base station in communication with user equipment.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes an access point 102 which communicates over a transmission medium with one or more user devices 106-1 through 106-N. Each of the user devices may be referred to herein as a "user equipment" (UE). Thus, the user devices are referred to as UEs or UE devices.

The access point 102 may be an access point providing a wireless local area network (WLAN). The access point 102 may be equipped to communicate with a network 100 (e.g., a wide area network (WAN), such as the Internet, among various possibilities). Thus, the access point 102 may facilitate communication between the UEs 106 and/or between the UEs 106 and the network 100. The access point 102 and the UEs 106 may be configured to communicate over the transmission medium using Wi-Fi, including any of various versions of IEEE 802.11 (e.g., a, b, g, n, ac, etc.).

As shown, multiple UEs 106 (e.g., UE 106A and UE 106B) may also be configured to communicate directly with each other, e.g., using a peer-to-peer wireless communication protocol. For example, Bluetooth ("BT", including BT low energy ("BLE"), Alternate MAC/PHY ("AMP"), and/or other BT versions or features), Wi-Fi ad-hoc/peer-to-peer, and/or any other peer-to-peer wireless communication protocol may be used to facilitate direct communications between two UEs 106.

In addition, at least one UE 106 (e.g., UE 106A) may be configured to communicate with a base station 104. The base station 104 may be a base transceiver station (BTS) or cell site (a "cellular base station"), and may include hardware that enables wireless communication with UEs 106 according to one or more cellular communication protocols. The UE 106 and the cellular base station 104 may communicate using any of various cellular communication technologies such as GSM, UMTS (WCDMA), LTE, LTE-Advanced (LTE-A), 3GPP2 CDMA2000 (e.g., 1×RTT, 1×EV-DO, HRPD, eHRPD), etc.

As shown, the cellular base station may be equipped to communicate with a network 108 (e.g., a core network of a cellular service provider, a telecommunication network such as a public switched telephone network (PSTN), and/or the Internet, among various possibilities). Thus, the base station 104 may facilitate communication between UEs 106 and/or between the UEs 106 and the network 108. In particular, the cellular base station 104 may provide UEs 106 with various telecommunication capabilities, such as voice and SMS services (e.g., typically via circuit-switched wireless links) and/or data services (e.g., typically via packet-switched wireless links).

A UE 106 may be capable of communicating using multiple wireless communication standards. For example, the UE 106 may be configured to communicate using at least one peer-to-peer wireless communication protocol (e.g., BT, Wi-Fi peer-to-peer, etc.) and at least one cellular communication protocol (e.g., GSM, UMTS (WCDMA), LTE, LTE-Advanced (LTE-A), 3GPP2 CDMA2000 (e.g., 1×RTT, 1×EV-DO, HRPD, eHRPD), etc.). The UE 106 may also or alternatively be configured to communicate using one or more global navigational satellite systems (GNSS, e.g., GPS or GLONASS), one or more mobile television broadcasting standards (e.g., ATSC-M/H or DVB-H), and/or any other wireless communication protocol, if desired. Other combinations of wireless communication standards (including more than two wireless communication standards) are also possible.

FIG. 2 illustrates user equipment 106 (e.g., one of the devices 106A through 106N) in communication with the cellular base station 104. The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the methods embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of CDMA2000, LTE, LTE-A, Wi-Fi, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards; for example, the UE 106 might be configured to communicate using either of CDMA2000 (1×RTT/1×EV-DO/HRPD/eHRPD) or LTE using partially or entirely shared wireless communication circuitry (e.g., using a shared radio or at least shared radio components). The shared communication circuitry may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios or radio components which are shared between multiple wireless communication protocols, and one or more radios or radio components which are used exclusively by a single wireless communication protocol. For example, the UE 106 might include a shared radio for communicating using either of LTE or CDMA2000 1×RTT, and separate radios for communicating using each of Wi-Fi and Bluetooth. Other configurations are also possible.

Figure 3:
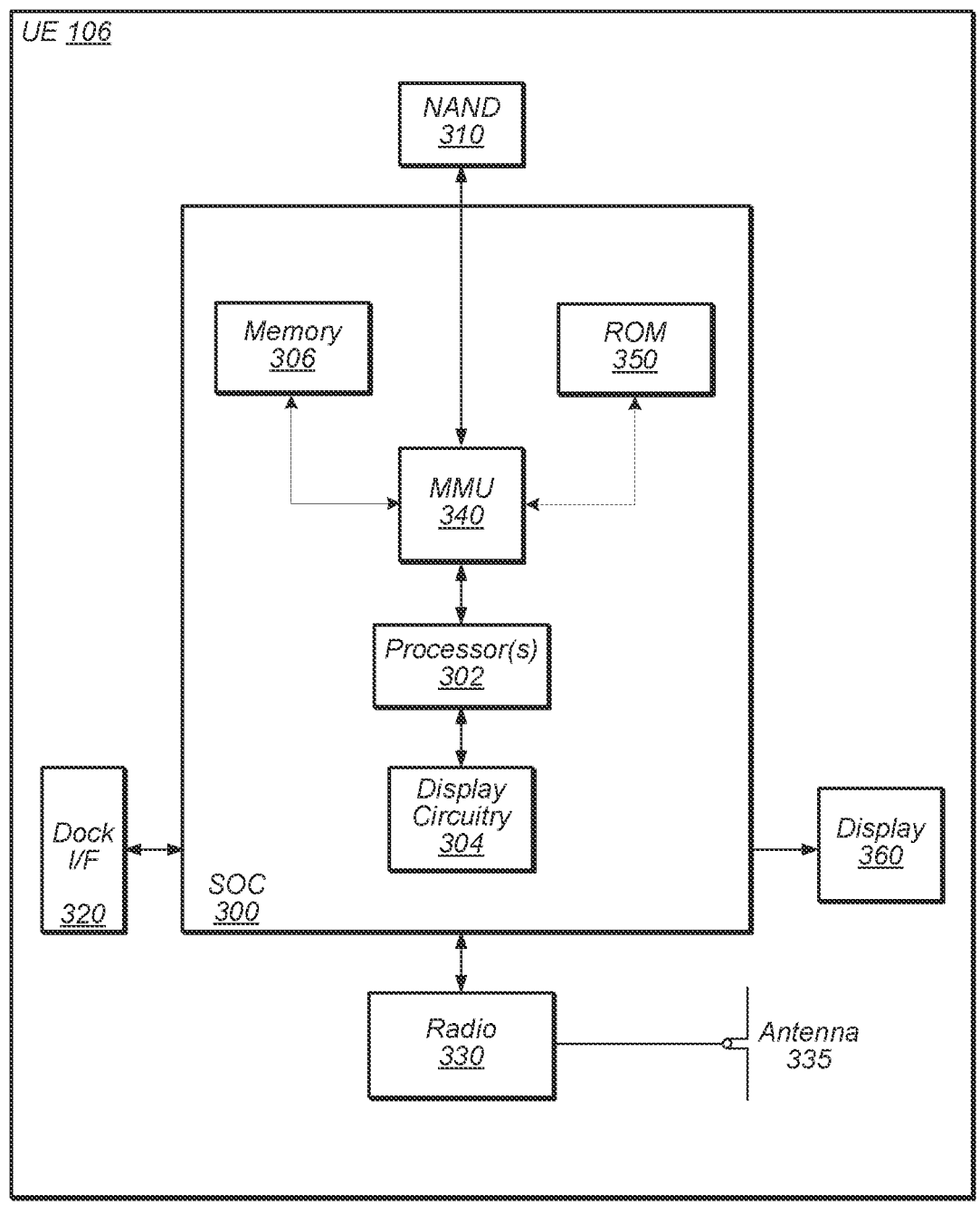
FIG. 3 illustrates an exemplary block diagram of a UE.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, wireless communication circuitry 330 (also referred to as a "radio"), connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry 330 (e.g., for LTE, LTE-A, CDMA2000, Bluetooth, Wi-Fi, GPS, etc.).

As noted above, the UE 106 may be configured to communicate wirelessly using multiple wireless communication standards. As further noted above, in such instances, the wireless communication circuitry (radio(s)) 330 may include radio components which are shared between multiple wireless communication standards and/or radio components which are configured exclusively for use according to a single wireless communication standard. As shown, the UE device 106 may include at least one antenna (and possibly multiple antennas, e.g., for MIMO and/or for implementing different wireless communication technologies, among various possibilities), for performing wireless communication with base stations, access points, and/or other devices. For example, the UE device 106 may use antenna 335 to perform the wireless communication.

The UE 106 may also include and/or be configured for use with one or more user interface elements. The user interface elements may include any of various elements, such as display 360 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

Figure 5:
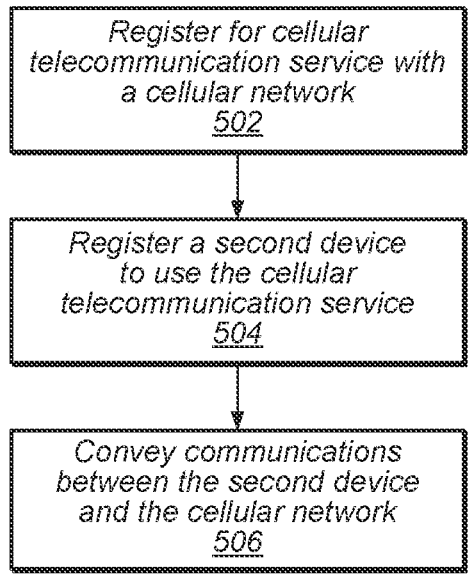
FIG. 5 is a flowchart diagram illustrating an exemplary method for a wireless device to extend use of its cellular communication capability to another device.
Figure 6:
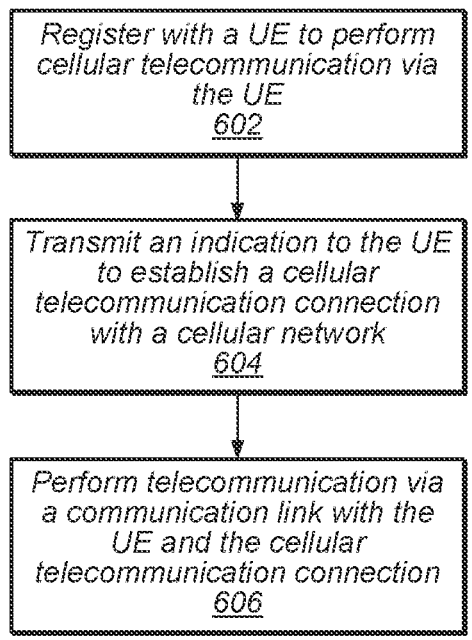
FIG. 6 is a flowchart diagram illustrating an exemplary method for a device to use the cellular communication capability of a wireless device.

As described herein, the UE 106 may include hardware and software components for implementing features for extending use of cellular communication capabilities to another device, such as those described herein with reference to, inter alia, FIG. 5 and/or FIG. 6. The processor 302 of the UE device 106 may be configured to implement part or all of the features described herein, e.g., by executing program instructions stored on a memory medium (e.g., a non-transitory computer-readable memory medium). Alternatively (or in addition), processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 350, 360 may be configured to implement part or all of the features described herein, such as the features described herein with reference to, inter alia, FIG. 5 and/or FIG. 6.

Figure 4:
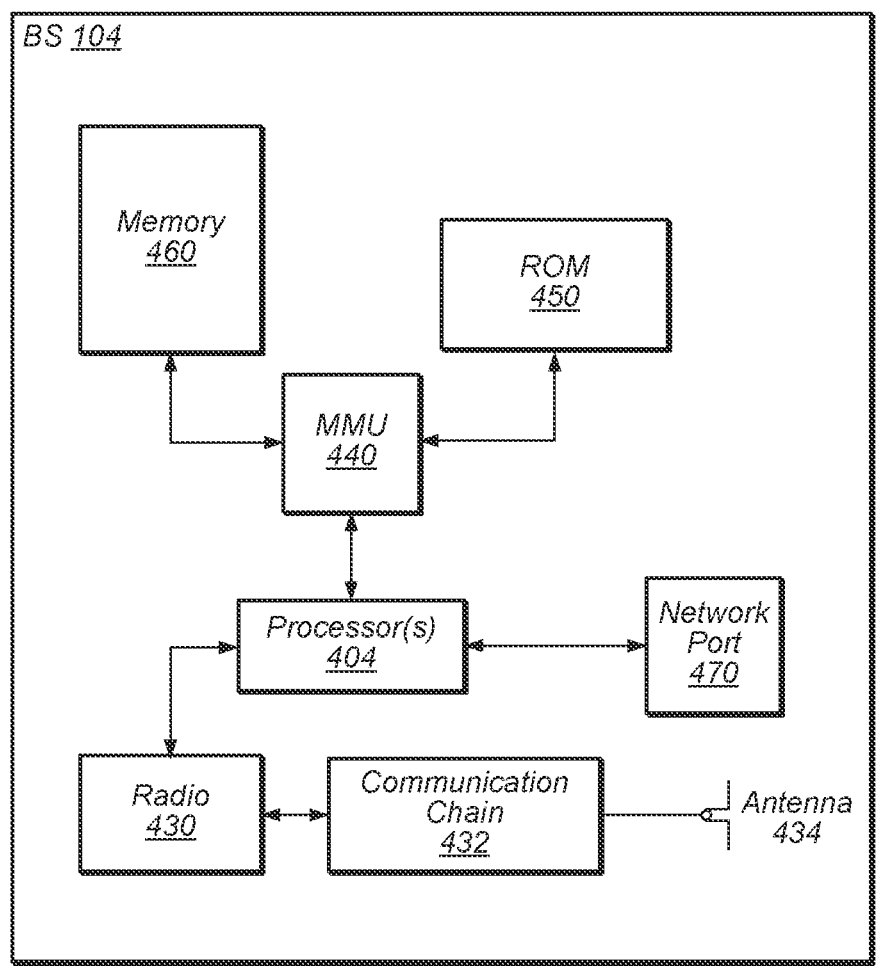
FIG. 4 illustrates an exemplary block diagram of a base station.

FIG. 4—Exemplary Block Diagram of a Base Station

FIG. 4 illustrates an exemplary block diagram of a cellular base station (BS) 104. It is noted that the base station of FIG. 4 is merely one example of a possible base station. As shown, the base station 104 may include processor(s) 404 which may execute program instructions for the base station 104. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 104 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 104 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, WCDMA, CDMA2000, etc.

The base station 104 may be configured to support extension of cellular communication to devices without native cellular communication capabilities. In particular, as described further subsequently herein, the BS 104 may include hardware and software components for implementing (or for use in conjunction with a UE 106 implementing) part or all of a method for a UE 106 to extend the use of its cellular communication capabilities to another device.

The processor 404 of the base station 104 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

FIGS. 5-6—Flowcharts

Currently, it is common that a user's subscription for cellular service is tied to a single specific cellular device. Even in the case of group cellular subscriptions (e.g., family plans), it is generally required to obtain and assign a separate account (or possibly sub-account) and phone number for each device in the plan.

However, some groups (e.g., families) or individuals might wish to share a cellular service account among multiple devices. In particular, it may be common for some users to possess multiple devices, of which one or more may include cellular communication capability (e.g., may include cellular communication circuitry/a cellular radio and be configured for cellular telecommunications), while one or more may not include be configured for cellular communication (e.g., may not include a cellular radio or other cellular communication circuitry), but may include alternative wireless and/or wired communication capabilities, such as a Wi-Fi radio/circuitry/software. In such cases it would be desirable to provide a way for a cellular device to provide the use of its cellular telecommunication capability to other devices, potentially increasing the convenience and utility of all of the devices involved.

Accordingly, certain embodiments of the present disclosure relate to a method for a UE device to extend use of its cellular telecommunication capability to another device, and to a method for a device to use the cellular telecommunication capability of a UE. FIGS. 5-6 are flowchart diagrams illustrating such a method. The methods shown in FIGS. 5-6 may be used in conjunction with any of the computer systems or devices shown in the above Figures, among other devices. Some of the method elements shown may be performed concurrently, in a different order than shown, or may be omitted. Additional method elements may also be performed as desired.

FIG. 5 relates, in particular, to a method for a UE to extend cellular communication capability provided by the UE to another device. The method may be performed by the UE itself. As noted above, the UE may be any of a variety of devices. A common example may include a smart phone, e.g., which is configured for wireless communication according to one or more cellular communication protocols (e.g., UMTS, LTE, and/or CDMA2000, among various possibilities), Wi-Fi, and Bluetooth, and which is configured to execute a mobile operating system such as iOS™ or Android™. Of course, the UE may alternatively be any of a variety of other types of device, as desired, including but not limited to tablet computers, e-readers, portable multimedia players, portable gaming systems, and/or other cellular devices. Alternatively or additionally, the UE may be the UE device 106 described above in detail with reference to FIG. 3. As shown, the method may operate as follows.

In 502, the UE may register for cellular telecommunication service with a cellular network. The registration may be performed via wireless communication (e.g., via a cellular radio of the UE) with a base station (which may provide a cell) operated by the cellular network. The registration may include transmitting and receiving various data configuring the UE according to various parameters according to which the cellular network operates and identifying the UE to the network (e.g., based on subscriber identity information associated with a cellular service account and/or telephone number), among various possibilities. The actual nature of the registration process, including the types and content of data/messages transmitted between the UE and the cellular network, may vary according to various implementations, e.g., depending on a cellular communication protocol used by the UE and the cellular network and/or hardware and/or software configuration of the UE and the cellular network infrastructure. In general, registering the UE for cellular telecommunication service may enable the UE to place and receive voice calls, SMS messages, and/or data via cellular telecommunication with the cellular network.

In 504, the UE may register a second device with the UE to use the cellular telecommunication service. The second device may be any of a variety of types of device. For example, the second device may be another UE, e.g., a substantially mobile device configured to perform wireless communication, such as a tablet computer, a smart phone, a portable media player, or any of a variety of other types of UE. Alternatively, the second device may be a substantially stationary device, which may be configured for wireless and/or wired communication, such as a desktop computer, a television or other stationary media player, a gaming console, or any of a variety of other types of device.

Registering the second device with the UE may be performed in any of a variety of ways. As one example, the second device may be registered via peer-to-peer Wi-Fi communication or Wi-Fi communication via a Wi-Fi access point, e.g., if the UE and the second device are within Wi-Fi communication range of each other and both devices are configured to perform Wi-Fi communication. As another example, the second device may be registered via a wide area network (WAN), such as the internet. Note that, in some instances, the second device may not be configured for cellular communication (e.g., may not include a cellular radio).

In further detail, consider a situation in which the UE and the second device are connected to a common Wi-Fi access point (e.g., are both connected to the same Wi-Fi network, such as a home Wi-Fi network). The UE and the second device might discover each other using multicast domain name system (mDNS) and establish a server/client connection, and the UE might then provision the second device to use the UE's cellular telecommunication capability.

Consider also an alternative situation in which the UE and the second device are connected via a WAN (e.g., via one or more wired and/or wireless links, possibly including one or more of Wi-Fi, Ethernet, broadband over power line (BPL), etc.). The UE and the second device might each register with a server computer accessible via the WAN. By registering, the UE and the second device may be associated with each other (e.g., by registering for use together and/or with a single account, such as the cellular service account corresponding to the UE and/or an account with a third party providing the server), and the second device may be provisioned to use the UE's cellular telecommunication capability.

In the case of a local connection or in the case of a WAN connection between the UE and the second device, the discovery and provision process could be automatic, manual, or partially automatic and partially manual. For example, the UE might prompt a user (e.g., via a user interface), upon discovery of the second device on the Wi-Fi network or attempted registration of the second device via the WAN, as to whether or not to provision/permit the discovered device to use cellular telecommunication capability provided by the UE. Alternatively, the UE might also require prompting by a user to initiate an attempt to discover the second device, or the UE might instead automatically discover and provision any other devices available via a local Wi-Fi network or which have attempted to register with the UE via a WAN.

Further configuration details could also be determined (e.g., automatically or manually) at that time or at another time, if desired. For example, it might be desirable to provide cellular telecommunication capabilities to certain devices only under certain circumstances.

As one example, the UE and the second device might establish a selective call forwarding policy. Thus, the UE might forward only certain incoming calls to the second device, and/or forward incoming calls to the second device only at certain times. An example of a situation in which forwarding only certain incoming calls to the second device might be desirable could be if the cellular service account were being shared between multiple users. In this case, indications of incoming calls from contacts of a user of the second device might be forwarded to the second device (possibly not alerting the user of the UE, e.g., if the incoming call is not also a contact of a user of the UE), while indications of incoming calls which are not from contacts of a user of the second device might not be forwarded to the second device. Thus, for example, a parent might be the user of the UE, while a child might be the user of the second device; if the incoming call were from a friend of the child, it might be desirable for an alert (e.g., a ring or vibration) of the incoming call to be forwarded to the second device. As another possibility, if certain contacts of a user are "work" contacts, indications of incoming calls from those contacts might be forwarded only to the second device if it is designated a "work" device, while if certain contacts of a user are "personal" contacts, indications of incoming calls from those contacts might be forwarded only to the second device if it is designated a "personal" device. Note that such designations may not need to be mutually exclusive; for example, a user might designate some contacts and/or devices as "work" only, others as "personal" only, and still others as both "work" and "personal". Further, note that the exemplary designations "work" and "personal" are provided by way of example only, and any number of other designations could be defined and used, as desired.

Similar selective forwarding considerations could be applied in a temporal manner. For example, indications of incoming calls might be forwarded to a given device only at certain times, e.g., based on one or more designations or labels and rules applied to one or more contacts and/or to the device.

Furthermore, similar considerations may also be applied to permission to initiate outgoing calls. For example, certain devices may be permitted to initiate calls only between certain hours and/or to certain contacts. For example, it might be desirable to limit a child's use of the cellular telecommunication capability of a parent's UE, among various possibilities.

Another possible selective forwarding mechanism might relate to the activity level of a device being used as a cellular extension of the UE. For example, the UE might forward indications of incoming calls only to a device if it exhibits a certain activity level, e.g., as might be detected based on certain activity indicators (such as if the device is on, awake, unlocked, and/or has an active communication connection, among various possible activity indicators). If a device is not available, or is available but not sufficiently active, the UE might be configured not to forward indications of incoming calls to the device.

As will be recognized by those of skill in the art, the above-described selective forwarding options represent just a few of numerous possible selective forwarding options, which could alternatively or additionally be implemented, as desired.

In 506, the UE may convey communications between the second device and the cellular network. By doing so, the UE may enable the second device to perform cellular telecommunication via the UE. In particular, the UE may establish a cellular telecommunication link with the cellular network (e.g., via one or more base stations) on behalf of the second device, and may transmit data received from the second device (via a communication link with the second device) via the cellular telecommunication link as well as transmit data received via the cellular telecommunication link to the second device. The cellular telecommunication link may include a circuit-switched communication link (e.g., for voice calls and/or SMS messages). Alternatively, or in addition, the cellular telecommunication link may include a packet-switched communication link (e.g., for data, possibly including voice-over-internet protocol (VoIP) voice calls and/or other types of calls). Conveying communications between the second device and the cellular network may effectively provide use of the UE's cellular service account to the second device for cellular telecommunication.

As noted above, the communication link between the UE and the second device may include any of a variety of types of communication links, for example including a Wi-Fi wireless local area network (WLAN) or a WAN. It should further be noted that in some cases it may be desirable to initially establish/utilize an indirect communication link (e.g., via a Wi-Fi access point providing a WLAN or via a server accessible via a WAN) for discovery, registration, and/or provisioning, then to establish a more direct type of communication link (e.g., a Wi-Fi peer-to-peer connection such as according to IEEE 802.11z/tunneled direct link setup (TDLS) or a direct IP link via the WAN) for conveyance of telecommunication data, e.g., in order to reduce latency and/or power usage. Alternatively, conveyance of telecommunication data may also be performed via an intermediary (e.g., a Wi-Fi access point or server), or discovery, registration, provisioning, and conveyance of telecommunication data may be performed via a more direct communication link.

Conveying communications may include facilitating initiation of outgoing communication (e.g., setting up an outgoing call) and/or facilitating reception of incoming communication (e.g., answering an incoming call) by the second device.

For example, consider an incoming call to the UE. The incoming call may be indicated to the UE by the cellular network via a paging message (or simply "page"). The UE may receive this page and provide an indication of the incoming page to the second device via the communication link between the UE and the second device. The second device may receive the indication of the incoming page, and if a user answers the call at the second device, the second device may transmit an indication responding to the incoming page to the UE via the communication link between the UE and the second device. The UE may receive this indication, respond to the incoming page via cellular communication, and establish the call. Thenceforth, communications (e.g., audio data) received from the cellular network may be provided to the second device, and communications received from the second device may be provided to the cellular network.

Similarly, consider an outgoing call. A user of the second device might indicate (e.g., via a user interface) at the second device to initiate an outgoing call, for example by dialing a phone number. The second device might then transmit a request to perform cellular telecommunication (e.g., to establish a cellular telecommunication link to a device associated with the dialed phone number) to the UE. The UE might accordingly receive the request via the communication link between the UE and the second device, and establish a cellular telecommunication link with a device associated with the dialed phone number via the cellular network in response to the request. Thenceforth (assuming the call is successfully placed), similarly to the above-described example of the incoming call, communications received from the cellular network may be provided to the second device, and communications received from the second device may be provided to the cellular network. Thus, in both the cases of incoming and outgoing calls, the second device may be able to make use of the UE's cellular telecommunication capability (potentially effectively including use of the UE's cellular service account, phone number(s), and/or subscriber identity information) to perform telecommunication as a cellular extension of the UE.

Note that while the above examples may relate primarily to voice calls, other forms of cellular telecommunication (e.g., SMS messages) may similarly be conveyed between the second device and the cellular network in a similar manner, if desired.

Note also that the actual conveyance of communications between the UE and the second device may be implemented in any of a number of ways. As one example, the cellular communications received by the UE from the cellular network may be decoded by the UE and converted to an alternate (non-cellular) format for transmission to the second device. For example, a "cellular extension" application executing on the UE might translate audio and/or other data/signaling messages (e.g., paging messages) received from the cellular network via cellular communication into a different (generic or proprietary) format for transmission to the second device. A similar application executing on the second device might then interpret and present the data received in the different format. A similar data exchange (e.g., including generation and transmission of data in a non-cellular format by the second device to the UE, and translation from the non-cellular format to a cellular format and cellular transmission in the cellular format by the UE) could be performed for outgoing data and signaling messages from the second device to the cellular network. Note that in this case, there may be no need for the second device to implement a cellular stack.

As another example, the cellular communications (e.g., circuit-switched voice, SMS, and/or signaling communications) received by the UE from the cellular network may be encapsulated in a non-cellular communication format (e.g., for Wi-Fi and/or other non-cellular communication links) for transmission to the second device. In this case, the second device may utilize both one or more non-cellular layers (or entire stacks) for processing (de-capsulating) the encapsulated cellular data, as well as a cellular stack configured to receive and process the cellular communications after de-encapsulation. Similarly, the second device might generate outgoing data in a cellular format, then encapsulate the cellular data for non-cellular communication to the UE. The UE in turn could de-encapsulate and transmit the received cellular data to the cellular network via cellular communication. Such cellular encapsulation could similarly be performed by a "cellular extension" application executing on each of the UE and the second device, in some implementations; in this case, the cellular extension application might provide a cellular stack for the second device. Note that even if the second device implements a cellular stack, it may still not be necessary that the second device actually perform cellular communications, since any cellular data generated (or received) by the cellular stack of the second device may be encapsulated for (or de-encapsulated from) communication according to a non-cellular communication technology.

As noted above, while provisioning the second device to use cellular telecommunication capability provided by the UE, various usage parameters and/or preferences could be selected, such as various possibilities for selective call forwarding or selective permission to initiate outgoing calls. For example, with reference to the possibility of selective forwarding or outgoing call initiation based on contacts associated with the UE and/or the second device, an "address book" feature might be implemented. The address book may be a memory structure and/or application for storing contact information (e.g., names, phone numbers, e-mail addresses, text/voice/video chat or VoiP usernames, etc.). The UE may have an address book with sections for the UE and the second device, or the UE and the second device may each have address books, among various possibilities. Thus, for example, indications of incoming calls (pages) and/or permission to initiate outgoing calls might be provided to the second device or not based on identifying the presence or absence of an association of the source/destination of the incoming/outgoing call with the second device in the address book. Any number of alternative ways of implementing selective forwarding and/or permission to initiate outgoing calls for specific devices acting as cellular extensions to the UE are also possible.

It should be noted that it may be desirable, especially for conveyance of voice calls between the second device and the cellular network, to implement quality of service (QoS) standards, in particular for the communication link between the UE and the second device. For example, if a Wi-Fi link is involved in the communication link between the UE and the second device (either as the sole/primary link or as part of a WAN link), IEEE 802.11e QoS may be implemented for improving call quality. Additionally, unscheduled automatic power save delivery (U-APSD) may be implemented, e.g., for power savings, if desired. Other QoS or similar standards may also or alternatively be used for improving call quality and/or power savings, as desired.

Note also that while the steps of FIG. 5 are described primarily as being performed with respect to the UE and a second device, any number of other devices might similarly be registered and provisioned to use the cellular telecommunication capability of the UE, and the UE might similarly convey communications between such devices and the cellular network (e.g., at various times). In other words, one or more steps similar to those described above may be performed between the UE and one or more additional devices, such that multiple devices might be registered to use the cellular telecommunication capability of the UE at any given time (although it may be possible that only one such device might actually use the cellular telecommunication capability of the UE at any given time). For example, the UE might provide an indication of an incoming page to all (or at least multiple) of the devices registered to use the cellular telecommunication capability of the UE, and might respond to such an incoming page based on receiving a response to the incoming page from any of the devices (or the UE itself). Assuming a response to the incoming page is received from one of the devices, the UE might then establish the call between the UE and the cellular network and convey communications associated with the call between the UE and the device which responded to the page.

FIG. 6 relates to a method for a device without a cellular radio (but potentially with a Wi-Fi radio) to make use of a cellular radio in a UE. The method may be performed by the device itself. Note that the method of FIG. 6 may be complementary to the method of FIG. 5. For example, the "second device" described with respect to FIG. 5 may be the device implementing the method of FIG. 6, while the UE implementing the method of FIG. 5 may be the UE providing use of its cellular radio to the device implementing the method of FIG. 6. As shown, the method may operate as follows.

In 602, the device may register with a UE to perform cellular telecommunication via the UE. Registration may be performed via any of a variety of types of communication links, including Wi-Fi (e.g., peer-to-peer or via an access point/WLAN) and/or WAN (e.g., the Internet, via a server or a direct IP link). Once the device is registered (and provisioned with any required or optional configuration information), the device and the UE may update the communication link (e.g., to a more direct link such as a peer-to-peer link or a direct IP link from a less direct link such as a WLAN link via an access point or a WAN link via a server), if desired, or may continue to use the same communication link (e.g., if not configured for a more direct link, such as if one or both of the devices are behind a firewall and don't use network address translation (NAT), or are not configured for Wi-Fi peer-to-peer communication).

In 604, an indication may be transmitted to the UE to establish a cellular telecommunication connection with a cellular network. The indication may take any of a variety of forms, may include any of a variety of types of information and may be provided in response to any of a number of types of messages. The indication may be transmitted based on user input (e.g., responding to or initiating a call), which might be received via a user interface.

For example, as one possibility, the indication may be an indication to initiate an outgoing call. In this case, the device might receive user input indicating a phone number (or other contact information, which the device might translate (e.g. into a phone number, using an address book correlation/association between the provided contact information and the phone number) or use directly, as appropriate) to call. The device might in turn provide an indication of the phone number or other contact information to the UE via the communication link between the device and the UE and a request to initiate a call (or send an SMS message) to that contact. The UE might then place (establish) the call via its cellular telecommunication capability (e.g., using its cellular radio).

As another possibility, the indication may be an indication to respond to an incoming call. For example, the UE might have received a paging message indicative of an incoming call (e.g., from the cellular network, using its cellular radio). The UE might have transmitted an indication of the paging message (potentially including caller identification information such as a phone number and/or name associated with the caller) to the device, which the device may in turn have received. The indication to establish the cellular telecommunication connection with the cellular network might accordingly be provided to the UE by the device in response to the indication of the incoming call, e.g., to answer the call. The UE might then acknowledge and set up (establish) the call via its cellular telecommunication capability (e.g., using its cellular radio)

Note that it is possible that the device might be actively used at a time that an incoming call is received. For example, the device might be capable of presenting media content (e.g., music, videos, etc.). If desired, the device may be configured to pause or interrupt any (or certain selected types of) media that is being presented if an incoming call is received. For example, upon receiving an indication of an incoming page, the device might pause any content which is being presented, then present an indication of the incoming call (e.g., a textual or graphic message on a screen, a ringing or beeping, and/or another type of indication). If the incoming call is accepted, the content might continue to be paused, while if the incoming call is rejected (or simply not answered), the device might automatically resume presentation of the content. Alternatively, the content might continue to be paused until a user manually indicated to the device to continue presentation of the content.

In 606, telecommunication may be performed between the device and the cellular network via the communication link with the UE and the cellular telecommunication connection between the UE and the cellular network. In other words, once the (incoming or outgoing) call has been established, the UE may convey data between the device and the cellular network, thereby extending use of the cellular telecommunication connection it has established to the device. Thus, data (e.g., audio data) may be received from the cellular network by the UE and provided to the device. The device may receive the data and also provide data (e.g., audio data) to the UE. The UE may also receive the data from the device and provide that data to the cellular network.

Note that if desired, similar selective incoming call forwarding and/or outgoing call permission may be provided as described hereinabove with respect to FIG. 5. Thus, if desired, indications of selected incoming calls may be provided to the device while no indications may be provided to the device in the case of other incoming calls, based on any of a variety of considerations. Similarly, indications to establish outgoing calls from the device might be accepted and acted upon by the UE for attempted selected outgoing calls, but rejected for other attempted outgoing calls, based on a variety of considerations, if desired.

Note also that, as also described hereinabove with respect to FIG. 5, the communicative connection between the device and the UE for conveying telecommunication may be established as subject to certain QoS and/or power savings considerations, such as IEEE 802.11e QoS and/or U-APSD, among various possibilities, if desired.

Additionally, note that although in some of the examples described hereinabove with respect to, inter alia, FIGS. 5 and 6 extension of cellular communication capabilities by a UE to another device are described as being performed via Wi-Fi communication, any number of other communication technologies may be used in addition or as alternatives to Wi-Fi for extending a cellular communication capability to another device. For example, any of near field communication (NFC), Bluetooth, various local and/or wide area networking technologies, and/or any other non-cellular communication technology may be used individually or in combination to provide a communication link between a UE and a device to which the UE is extending use of its cellular communication capability.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

I claim:

1. A wireless device, comprising:
   a non-cellular wireless interface, configured for non-cellular wireless communication;
   one or more processors communicatively coupled to the non-cellular interface wireless interface, wherein the one or more processors are configured to:
      establish, via the non-cellular wireless interface, a peer-to-peer non-cellular wireless communication link with a first wireless device, wherein the first wireless device is connected with a cellular network using a cellular communication link, wherein the connection between the first wireless device and the cellular network uses a first cellular service account; and
      perform communication between the wireless device and the cellular network via the non-cellular wireless communication link with the first wireless device and the cellular communication link between the first wireless device and the cellular network, wherein performing communication between the wireless device and the cellular network provides use of the first cellular service account to the first wireless device.

2. The wireless device of claim 1, wherein the one or more processors are further configured to:
   establish, via a second non-cellular wireless interface, a second peer-to-peer non-cellular wireless communication link with the first wireless device;
   wherein said performing communication between the wireless device and the cellular network is further based on the second non-cellular wireless interface.

3. The wireless device of claim 2, wherein the peer-to-peer non-cellular wireless communication link is Bluetooth link, wherein the second peer-to-peer non-cellular wireless communication link is a near field communication (NFC) link.

4. The wireless device of claim 2, wherein the one or more processors are further configured to:
   establish, via a third non-cellular wireless interface, a third non-cellular wireless communication link with the first wireless device; and
   communicate with the first wireless device using the third non-cellular wireless link.

5. The wireless device of claim 4, wherein the peer-to-peer non-cellular wireless communication link is a Bluetooth link, wherein the second peer-to-peer non-cellular wireless communication link is a near field communication (NFC) link, and wherein the third non-cellular wireless communication link is a wireless local area network (WLAN) link.

6. The wireless device of claim 1, wherein the wireless device is a computer.

7. The wireless device of claim 1, wherein the wireless device does not include a cellular radio.

8. The wireless device of claim 1, wherein the one or more processors are configured to:
   provide a notification to initiate a phone call to the first wireless device, wherein the first wireless device is configured to provide signaling to the cellular network to initiate the phone call using the first cellular service account;
   wherein said performing communication between the wireless device and the cellular network is performed in response to initiating the phone call using the first cellular service account.

9. The wireless device of claim 1, wherein the one or more processors are configured to:
   receive a notification of an incoming phone call, associated with the first cellular service account, from the cellular network via the first wireless device; and
   wherein said performing communication between the wireless device and the cellular network is performed in response to acceptance of the phone call.

10. An apparatus, comprising:
    one or more processors, configured to cause a wireless device to:
       establish, via a non-cellular wireless interface, a peer-to-peer non-cellular wireless communication link with a first wireless device, wherein the first wireless device is connected with a cellular network using a cellular communication link, wherein the connection between the first wireless device and the cellular network uses a first cellular service account; and
       perform communication between the wireless device and the cellular network via the non-cellular wireless communication link with the first wireless device and the cellular communication link between the first wireless device and the cellular network, wherein performing communication between the wireless device and the cellular network provides use of the first cellular service account to the first wireless device.

11. The apparatus of claim 10, wherein the one or more processors are further configured to:
    establish, via a second non-cellular wireless interface, a second peer-to-peer non-cellular wireless communication link with the first wireless device;
    wherein said performing communication between the wireless device and the cellular network is further based on the second non-cellular wireless interface.

12. The apparatus of claim 11, wherein the peer-to-peer non-cellular wireless communication link is a Bluetooth link, wherein the second peer-to-peer non-cellular wireless communication link is a near field communication (NFC) link.

13. The apparatus of claim 10, wherein the peer-to-peer non-cellular wireless communication link is a Bluetooth link.

14. The apparatus of claim 10, wherein the wireless device does not include a cellular radio.

15. The apparatus of claim 10, wherein the one or more processors are configured to:
provide a notification to initiate a phone call to the first wireless device, wherein the first wireless device is configured to provide signaling to the cellular network to initiate the phone call using the first cellular service account;
wherein said performing communication between the wireless device and the cellular network is performed in response to initiating the phone call using the first cellular service account.

16. A non-transitory, computer accessible memory medium storing program instructions executable by at least one processor of a wireless device to:
establish, via a non-cellular wireless interface, a peer-to-peer non-cellular wireless communication link with a first wireless device, wherein the first wireless device is connected with a cellular network using a cellular communication link, wherein the connection between the first wireless device and the cellular network uses a first cellular service account; and
perform communication between the wireless device and the cellular network via the non-cellular wireless communication link with the first wireless device and the cellular communication link between the first wireless device and the cellular network, wherein performing communication between the wireless device and the cellular network provides use of the first cellular service account to the first wireless device.

17. The non-transitory, computer accessible memory medium of claim 16, wherein the program instructions are further executable to:
establish, via a second non-cellular wireless interface, a second peer-to-peer non-cellular wireless communication link with the first wireless device;
wherein said performing communication between the wireless device and the cellular network is further based on the second non-cellular wireless interface.

18. The non-transitory, computer accessible memory medium of claim 17, wherein the peer-to-peer non-cellular wireless communication link is a Bluetooth link, wherein the second peer-to-peer non-cellular wireless communication link is a near field communication (NFC) link.

19. The non-transitory, computer accessible memory medium of claim 16, wherein the peer-to-peer non-cellular wireless communication link is a Bluetooth link.

20. The non-transitory, computer accessible memory medium of claim 16, wherein the wireless device does not include a cellular radio.

* * * * *